United States Patent
Matsumura et al.

(10) Patent No.: US 12,120,665 B2
(45) Date of Patent: Oct. 15, 2024

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 404 days.

(21) Appl. No.: 17/617,843

(22) PCT Filed: Jun. 13, 2019

(86) PCT No.: PCT/JP2019/023583
§ 371 (c)(1),
(2) Date: Dec. 9, 2021

(87) PCT Pub. No.: WO2020/250400
PCT Pub. Date: Dec. 17, 2020

(65) Prior Publication Data
US 2022/0248426 A1 Aug. 4, 2022

(51) Int. Cl.
*H04W 72/1263* (2023.01)
*H04L 1/08* (2006.01)
*H04L 1/1607* (2023.01)
*H04W 72/23* (2023.01)

(52) U.S. Cl.
CPC .......... *H04W 72/1263* (2013.01); *H04L 1/08* (2013.01); *H04L 1/1642* (2013.01); *H04W 72/23* (2023.01)

(58) Field of Classification Search
CPC ................................................. H04W 72/1263
See application file for complete search history.

(56) References Cited

U.S. PATENT DOCUMENTS

2022/0022233 A1* 1/2022 Lee .................. H04L 1/0031
2022/0045893 A1* 2/2022 Yamada ............. H04L 1/1896
2022/0124768 A1* 4/2022 Frenne .................. H04L 1/08

OTHER PUBLICATIONS

International Search Report issued in PCT/JP2019/023583 on Dec. 10, 2019 (1 page).
Written Opinion of the International Searching Authority issued in PCT/JP2019/023583 on Dec. 10, 2019 ( 3 pages).
Ntt Docomo, Inc.; "Enhancements on multi-TRP/panel transmission"; 3GPP TSG RAN WG1 #97, R1-1906224; Reno, USA; May 13-17, 2019 (7 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

*Primary Examiner* — Jason E Mattis
(74) *Attorney, Agent, or Firm* — Osha Bergman Watanabe & Burton LLP

(57) ABSTRACT

A terminal according to one aspect of the present disclosure includes a control section that determines mapping of a sequence of a redundancy version (RV) which is to be applied for a channel that is repeatedly transmitted, to each transmission occasion, based on a field of downlink control information (DCI) for scheduling the channel, and a receiving section that receives the channel based on the mapping. According to one aspect of the present disclosure, repetition processing can be appropriately controlled.

4 Claims, 20 Drawing Sheets

| TCI SET | TCI INCLUDED IN TCI SET |
|---|---|
| TCI SET 0 | {TCI #1} |
| TCI SET 1 | {TCI #1, TCI #2} |
| TCI SET 2 | {TCI #2, TCI #3} |
| TCI SET 3 | {TCI #3, TCI #4} |
| TCI SET 4 | {TCI #1, TCI #3} |
| TCI SET 5 | {TCI #2, TCI #4} |
| TCI SET 6 | {TCI #1, TCI #2, TCI #3} |
| TCI SET 7 | {TCI #1, TCI #2, TCI #3, TCI #4} |

| TCI FIELD VALUE | TCI SET |
|---|---|
| 000 | TCI SET 0 CONFIGURED BY RRC |
| 001 | TCI SET 1 CONFIGURED BY RRC |
| 010 | TCI SET 2 CONFIGURED BY RRC |
| 011 | TCI SET 3 CONFIGURED BY RRC |
| ... | ... |
| 111 | TCI SET 7 CONFIGURED BY RRC |

FIG. 2B

| TCI FIELD VALUE | TCI SET |
|---|---|
| 000 | TCI SET 0 ACTIVATED BY MAC CE |
| 001 | TCI SET 1 ACTIVATED BY MAC CE |
| 010 | TCI SET 2 ACTIVATED BY MAC CE |
| 011 | TCI SET 3 ACTIVATED BY MAC CE |
| ... | ... |
| 111 | TCI SET 7 ACTIVATED BY MAC CE |

| $rv_{id}$ INDICATED BY DCI FOR SCHEDULING PDSCH | $rv_{id}$ APPLIED TO nTH TRANSMISSION OCCASION | | | |
|---|---|---|---|---|
| | $n \bmod 4 = 0$ | $n \bmod 4 = 1$ | $n \bmod 4 = 2$ | $n \bmod 4 = 3$ |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

| $rv_{id}$ INDICATED BY DCI FOR SCHEDULING PDSCH | $rv_{id}$ APPLIED TO nTH TRANSMISSION OCCASION | | | |
|---|---|---|---|---|
| | $n \bmod 4 = 0$ | $n \bmod 4 = 1$ | $n \bmod 4 = 2$ | $n \bmod 4 = 3$ |
| 0 | 0 | 3 | 0 | 3 |
| 1 | Reserved | | | |
| 2 | Reserved | | | |
| 3 | 3 | 0 | 3 | 0 |

FIG. 9B

| $rv_{id}$ INDICATED BY DCI FOR SCHEDULING PDSCH | $rv_{id}$ APPLIED TO nTH TRANSMISSION OCCASION | | | |
|---|---|---|---|---|
| | $n \bmod 4 = 0$ | $n \bmod 4 = 1$ | $n \bmod 4 = 2$ | $n \bmod 4 = 3$ |
| 0 | 0 | 0 | 0 | 0 |
| 1 | Reserved | | | |
| 2 | Reserved | | | |
| 3 | Reserved | | | |

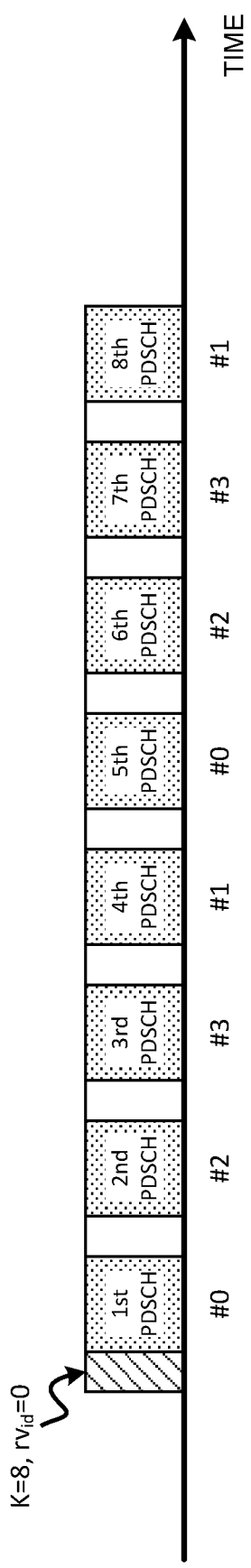
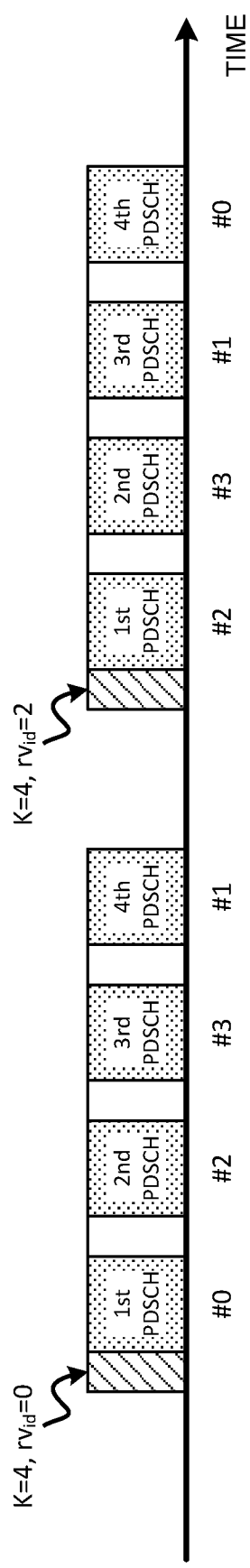
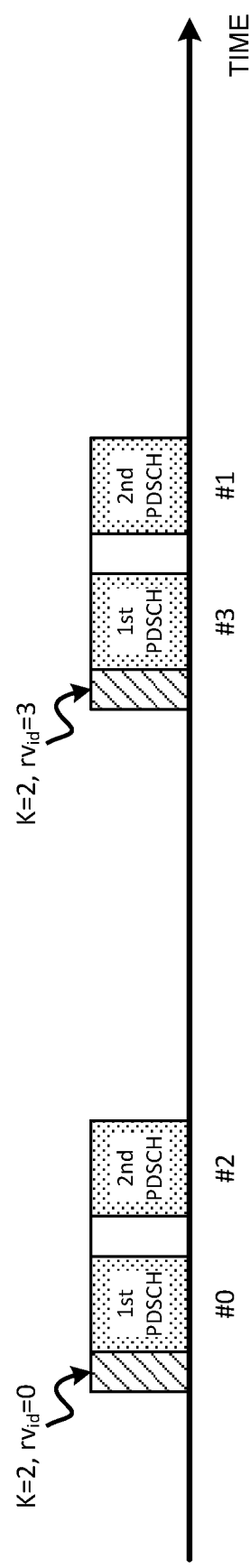
FIG. 10A
FIG. 10B
FIG. 10C

FIG. 11A

| $rv_{id}$ INDICATED BY DCI FOR SCHEDULING PDSCH | $rv_{id}$ APPLIED TO nTH TRANSMISSION OCCASION | | | |
|---|---|---|---|---|
| | $n$ mod 4 = 0 | $n$ mod 4 = 1 | $n$ mod 4 = 2 | $n$ mod 4 = 3 |
| 0 | 0 | 3 | 0 | 3 |
| 1 | 3 | 0 | 3 | 0 |

FIG. 11B

| $rv_{id}$ INDICATED BY DCI FOR SCHEDULING PDSCH | $rv_{id}$ APPLIED TO nTH TRANSMISSION OCCASION | | | |
|---|---|---|---|---|
| | $n$ mod 4 = 0 | $n$ mod 4 = 1 | $n$ mod 4 = 2 | $n$ mod 4 = 3 |
| 0 | 0 | 0 | 0 | 0 |

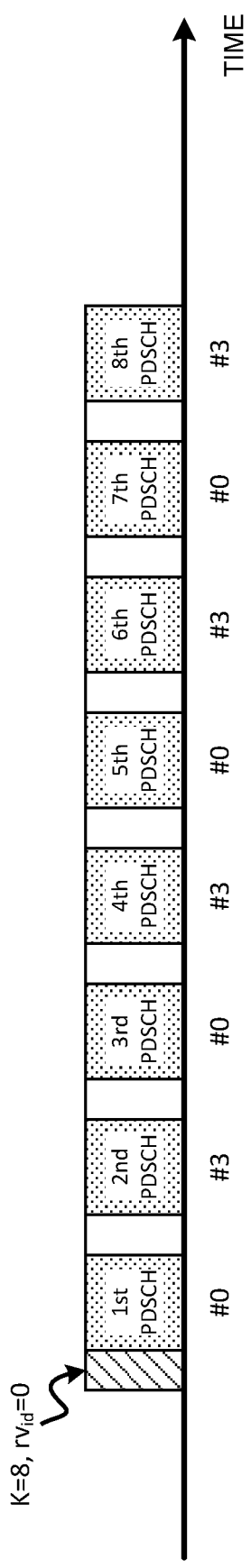
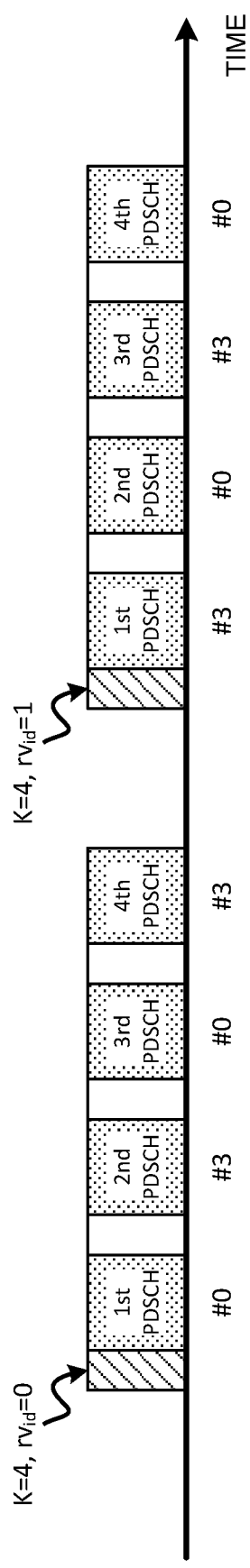
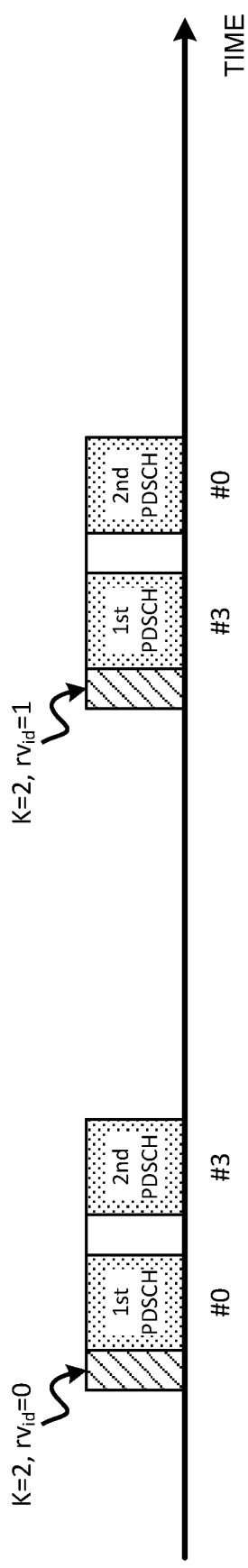

FIG. 13A

| $rv_{id}$ INDICATED BY DCI FOR SCHEDULING PDSCH | RV SEQUENCE |
|---|---|
| 0 | FIRST RV SEQUENCE CONFIGURED BY RRC |
| 1 | SECOND RV SEQUENCE CONFIGURED BY RRC |
| 2 | THIRD RV SEQUENCE CONFIGURED BY RRC |
| 3 | FOURTH RV SEQUENCE CONFIGURED BY RRC |

FIG. 13B

| $rv_{id}$ INDICATED BY DCI FOR SCHEDULING PDSCH | RV SEQUENCE |
|---|---|
| 0 | FIRST RV SEQUENCE CONFIGURED BY RRC |
| 1 | SECOND RV SEQUENCE CONFIGURED BY RRC |
| 2 | THIRD RV SEQUENCE CONFIGURED BY RRC |
| 3 | Reserved |

| JOINT CODE POINT | TCI | RV SEQUENCE |
|---|---|---|
| 000 | {#0, #1, #2, #3} | {#0, #0, #0, #0} |
| 001 | {#0, #1, #1, #0} | {#0, #3, #0, #3} |
| 010 | {#0, #2, #2, #0} | {#0, #3, #0, #3} |
| 011 | {#0, #3, #3, #0} | {#0, #3, #0, #3} |
| 100 | {#1, #2, #2, #1} | {#0, #3, #0, #3} |
| 101 | {#1, #3, #3, #1} | {#0, #3, #0, #3} |
| 110 | {#2, #3, #3, #2} | {#0, #3, #0, #3} |
| 111 | {#0, #0, #0, #0} | {#0, #2, #3, #1} |

FIG. 15

TERMINAL AND RADIO COMMUNICATION METHOD

TECHNICAL FIELD

The present disclosure relates to a terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a study is underway to allow a user terminal (user equipment (UE)) to perform repetition processing (such as repetition transmission and repetition reception) on a certain channel or signal in one or more transmission occasions.

For NR, applying a plurality of transmission configuration indication states (TCI states) for repetition transmission has been under study. This is because, in a case where a channel may be repeatedly transmitted by using a plurality of transmission/reception points (TRPs) (multi-TRP), each repetition is supposed to correspond to a different TCI state.

However, there is little advancement in study of the way a UE determines a TCI state and an RV for such repetition transmission and performs mapping to each transmission occasion. Inappropriate repetition processing may hinder an increase in communication throughput.

Thus, an object of the present disclosure is to provide a terminal and a radio communication method that can appropriately control repetition processing.

Solution to Problem

A terminal according to one aspect of the present disclosure includes a control section that determines mapping of a sequence of a redundancy version (RV) which is to be applied for a channel that is repeatedly transmitted, to each transmission occasion, based on a field of downlink control information (DCI) for scheduling the channel, and a receiving section that receives the channel based on the mapping.

Advantageous Effects of Invention

According to one aspect of the present disclosure, repetition processing can be appropriately controlled.

BRIEF DESCRIPTION OF DRAWINGS

FIG. 1 is a diagram to show an example of TCI sets;

FIGS. 2A and 2B are diagrams to show examples of correspondence relationships between TCI fields and TCI sets;

FIG. 8 is a diagram to show an example of mapping of an RV to each transmission occasion;

FIGS. 9A and 9B are diagrams to show examples of mapping of an RV to each transmission occasion in Mapping 2-1;

FIGS. 10A to 10C are diagrams to show examples of RVs applied for repetitions;

FIGS. 11A and 11B are diagrams to show examples of mapping of an RV to each transmission occasion in Mapping 2-2;

FIGS. 12A to 12C are diagrams to show examples of RVs applied for repetitions;

FIGS. 13A and 13B are diagrams to show examples of mapping of an RV to each transmission occasion in Third Mapping;

FIG. 15 is a diagram to show an example of correspondence relationships between TCI-RV set fields and TCI-RV sets;

DESCRIPTION OF EMBODIMENTS (Repetition Transmission)

Figure 3:
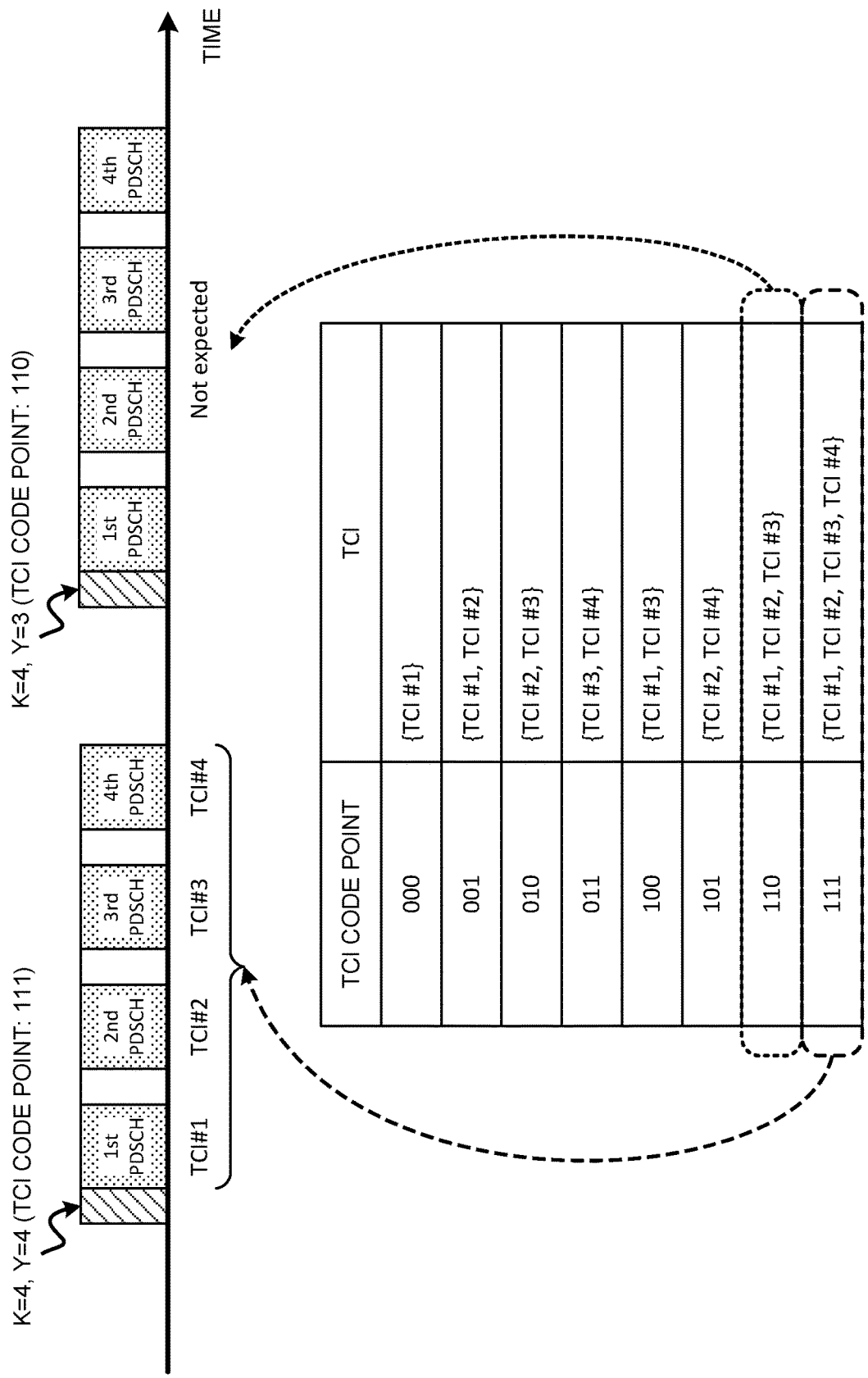
FIG. 3 is a diagram to show an example of a case where a UE does not expect to receive DCI that indicates the number of TCI states different from the number of repetitions.

For NR, a study is underway to transmit at least one of a channel and a signal (this may be represented as "channel/signal," hereinafter, "A/B" may be interpreted as "at least one of A and B" in a similar manner) with repetition, as well as of once.

For example, for NR, it has been under study that a UE or a base station transmits transport blocks (TBs) based on the same data (which may be rephrased with the "same TBs") in one or more transmission occasions. Each transmission occasion may correspond to a given time unit.

The given time unit may be, for example, a slot or a time unit shorter than a slot (such as a mini-slot). The mini-slot may be constituted of 7 symbols, 3 or 4 symbols, or 2 symbols. The mini-slot may be referred to as a "sub-slot," a "half-slot," and so on.

For example, the channel to which repetition transmission is applied may be at least one of an uplink control channel (physical uplink control channel (PUCCH)), an uplink shared channel (physical uplink shared channel (PUSCH)), a downlink control channel (physical downlink control channel (PDCCH)), a downlink shared channel (physical downlink shared channel (PDSCH)), and so on.

For example, in a case where repetition transmission of a certain channel/signal is configured or indicated by using higher layer signaling, physical layer signaling, or a combination thereof, a UE may repeatedly transmit the channel/signal or receive the repeatedly transmitted channel/signal (which may be referred to as "repetition reception"). The UE may perform repetition transmission or repetition reception with respect to a channel/signal to which the number of repetitions is configured or indicated.

Note that, in the present disclosure, higher layer signaling may be, for example, any one or combinations of radio resource control (RRC) signaling, medium access control (MAC) signaling, broadcast information, and so on.

For example, the MAC signaling may use MAC control elements (MAC CE), MAC Protocol Data Units (PDUs), and the like. The broadcast information may be, for example, master information blocks (MIBs), system information blocks (SIBs), minimum system information (remaining minimum system information (RMSI)), or other system information (OSI).

The physical layer signaling may be, for example, downlink control information (DCI).

The repetition transmission may be referred to as "slot aggregation transmission," "multi-slot transmission," "multi-mini-slot transmission," and so on.

Note that repetition of a PDSCH may be rephrased as a "plurality of PDSCHs of a plurality of time units (such as a plurality of slots, sub-slots, or mini-slots)," "PDSCH blind retransmission," "multi-slot PDSCH," "multi-sub-slot PDSCH," "multi-mini-slot PDSCH," a "plurality of PDSCHs including the same TB," and so on. The same rephrasing may apply to other channels.

In the present disclosure, transmission occasion, reception occasion, repetition (or repetition unit), slot, mini-slot, and so on may be interchangeably interpreted. In the present disclosure, repetition may be interpreted as at least one of repetition transmission and repetition reception.

Note that, in the present disclosure, the number of repetitions, a repetition number, a repetition factor, a repetition coefficient, K, and so on may be interchangeably interpreted.

Note that repetition of a certain channel/signal being one may indicate one transmission of the channel/signal at one time (no repetition).

The same symbol allocation may be employed among K time units (for example, slots or mini-slots). For example, the UE may determine symbol allocation of each time unit based on a start symbol index and the number of symbols, which are determined based on a value of a given field (for example, time domain resource allocation (TDRA) field) in DCI.

Redundancy versions (RVs) that are applied for TBs based on the same data may be the same or at least partially differ from each other, among K time units. For example, an RV that is applied for a TB of an n-th time unit may be determined based on a value of a given field (such as an RV field) in DCI.

For NR of Rel-16 or later versions, a study is underway to apply repetition transmission for ultra-reliable and low-latency communications (URLLC) service. For example, applying a plurality of transmission configuration indication states (TCI states) for repetition transmission has been under study. This is because, in a case where a PDSCH may be repeatedly transmitted by using a plurality of transmission/reception points (TRPs) (multi-TRP), each repetition is supposed to correspond to a different TCI state.

For example, in a case where one TB may be repeatedly transmitted by using a non-overlapping time resource in a single slot, each transmission occasion (granularity of mini-slot) of the TB may correspond to one TCI state and one RV. In another example, in a case where one TB may be repeatedly transmitted across different slots, the transmission occasion of the TB may correspond to one TCI state and one RV.

However, there is little advancement in study of the way the UE determines a TCI state and an RV for the repetition transmission and performs mapping to each transmission occasion. Inappropriate repetition processing may hinder an increase in communication throughput.

Thus, the inventors of the present invention came up with the idea of a method for appropriately controlling the repetition processing.

Embodiments according to the present disclosure will be described in detail with reference to the drawings, as follows. The radio communication method according to each embodiment may be employed independently or may be employed in combination.

Note that, in the present disclosure, a panel, an uplink (UL) transmission entity, a TRP, a spatial relation, a control resource set (CORESET), a PDSCH, a codeword, a base station, a given antenna port (such as a demodulation reference signal (DMRS) port), a given antenna port group (such as a DMRS port group), a given group (such as a code division multiplexing (CDM) group, a given reference signal group, and a CORESET group), and so on may be interchangeably interpreted.

A panel identifier (ID) and a panel may be interchangeably interpreted. In other words, the terms may be interchangeably interpreted between a TRP ID and a TRP, between a CORESET group ID and a CORESET group, and so on. An ID and an index may be interchangeably interpreted.

In the present disclosure, a sequence, a list, a set, a group, and so on, may be interchangeably interpreted.

The study has been mainly focused on applying repetition transmission that uses at least one of a plurality of TCI states and a plurality of RVs, to a case where a multi-TRP PDSCH is scheduled by single DCI based on URLLC. However, application of each embodiment of the present disclosure is not limited to this case.

The following descriptions of the embodiments assume repetition of a PDSCH, but are not limited thereto. Each of the embodiments may include matters in which the PDSCH is replaced with another channel/signal (such as a PUSCH, a PUCCH, or a PDCCH).

(Radio Communication Method)

First Embodiment

In a first embodiment, in relation to repetition of the PDSCH, a TCI state and an RV sequence may be indicated based on different respective fields in DCI. The mapping relationship between repetition (transmission occasion) of the PDSCH and a TCI state and the mapping relationship between repetition of the PDSCH and an RV sequence may be separately defined.

[TCI State for Repetition of PDSCH]

In the first embodiment, a set of TCI states (hereinafter also simply described as "TCI") to be applied for each repetition unit may be configured to the UE by higher layer signaling (such as RRC signaling).

Note that the set of TCIs (TCI set), a TCI sequence applied for repetition, a TCI group, a TCI pattern, and the like may be interchangeably interpreted. In the present disclosure, the TCI set may be constituted of one or a plurality of TCIs.

A correspondence relationship between an index of a TCI set and one or a plurality of TCI indices corresponding to the TCI set may be configured to a UE by RRC signaling.

FIG. 1 is a diagram to show an example of TCI sets. This example shows eight TCI sets of TCI sets 0 to 7, as the TCI sets. Note that the number of the TCI sets that are configured to the UE is not limited to eight.

As shown in FIG. 1, each TCI set may have the different number of included (or corresponding) TCIs. For example, TCI set 0 corresponds to one TCI (TCI #1), whereas TCI set 7 corresponds to four TCIs (TCIs #1 to #4). Note that, in the present disclosure, TCI index #x is also simply represented as "TCI #x," for convenience.

Note that one or a plurality of TCI sets that are configured by RRC signaling form the TCI sets may be activated by MAC signaling (such as a MAC CE).

For example, the eight TCI sets shown in FIG. 1 may correspond to TCI sets that are activated by a MAC CE, among configured TCI sets of more than eight. The MAC CE may include information such as an index of a TCI set and one or more TCI indices of TCIs to be activated.

The UE may determine one TCI set based on a certain field of DCI (for example, DCI format 1_1), from among TCI sets configured, activated, or the like by at least one of RRC signaling and a MAC CE. The DCI may correspond to DCI for indicating repetition of the PDSCH. Note that the certain field may be a field for identifying a TCI to be applied for repetition and may be referred to as a "TCI field," a "TCI set field," and so on.

The number of bits of the TCI field may vary depending on configured TCI sets or the number of candidates for (or maximum number of) TCI sets to be activated.

FIGS. 2A and 2B are diagrams to show examples of correspondence relationships between TCI fields and TCI sets. This example shows values (may be referred to as "code points") of the TCI fields included in DCI and corresponding TCI sets. This example shows an example of TCI fields of 3 bits.

FIG. 2A shows correspondence relationships in a case where TCI sets 0 to 7 are configured by RRC. FIG. 2B shows correspondence relationships in a case where TCI sets 0 to 7 are activated by a MAC CE.

The TCI sets that vary depending on the values of the TCI field are indicated. For example, in FIG. 2A, TCI sets 0, 1, and 2 that are configured by RRC are respectively associated to the values of the TCI fields: 000, 001, and 010.

Note that TCI sets may be configured to the UE, as shown in FIG. 1, or one or a plurality of TCIs corresponding to code points of TCI fields, as shown in FIG. 2A, may be directly configured or indicated to the UE without using the TCI sets.

The maximum number of TCI states that are included in (correspond to) each TCI set may be configured to the UE by higher layer signaling or may be based on UE capability or predetermined by specifications.

Different respective TCIs may be indicated to the UE by a plurality of TCI fields included in DCI. In one example, in a case where two TCI fields (TCI fields 1 and 2) are included in DCI, a UE may assume that TCI 1 indicated by TCI field 1 and TCI 2 indicated by TCI field 2 constitute one TCI set (they are applied for repetition of PDSCH).

[Mapping of TCI State to Each Transmission Occasion]

The UE may not expect to receive DCI that indicates the number of TCI states different from (for example, smaller than or larger than) the number of repetitions of the PDSCH in time domain. In this case, the UE may assume that an n-th transmission occasion (n=1, 2, . . . , K) among K time repetitions is associated with an n-th TCI state indicated by DCI.

In other words, the UE may assume that the UE receives DCI indicating the number of TCI states that is the same as the number of repetitions. This configuration simplifies processing that is performed by the UE.

FIG. 3 a diagram to show an example of the case where the UE does not expect to receive DCI that indicates the number of TCI states different from the number of repetitions. An example of correspondence relationships between values (code points) of TCI fields included in the DCI and TCIs (TCI sets) are shown at a lower part in FIG. 3. Each code point corresponds to one or a plurality of TCI states, which correspond to the TCI sets shown in FIG. 1.

An example of DCI and repetition of the PDSCH that is scheduled by the DCI is shown at an upper part in FIG. 3. Although this example shows repetitions (discretely) performed at a time interval, the repetitions may be performed by using continuous time resources. The same applies to the subsequent drawings.

Supposing that the number of TCI states indicated by one piece of DCI is Y (in other words, Y is the number of TCI states constituting a TCI set corresponding to DCI), as shown at an upper left part in FIG. 3, a UE may receive DCI of K=4 and Y=4 (code point=111). In this case, the UE may determine that an n-th repetition (n-th PDSCH) is an n-th TCI state of the corresponding TCI set. For example, the UE may determine that a first repetition ($1^{st}$ PDSCH) is a first TCI state (TCI #1) of the corresponding TCI set.

On the other hand, as shown at an upper right part in FIG. 3, the UE may not expect to receive DCI of K=4 and Y=3 (code point=110). If the UE receives such DCI, the UE may not perform (may skip) reception of PDSCH that is scheduled by the DCI.

Note that the number K of repetitions may be indicated by DCI or may be configured by higher layer signaling, as described above. In other words, in the present disclosure, DCI of K=X (X>0) (DCI indicating K=X) may mean DCI for notifying K or DCI for scheduling a PDSCH to be repeated K times that is configured by higher layer signaling.

Figure 4:
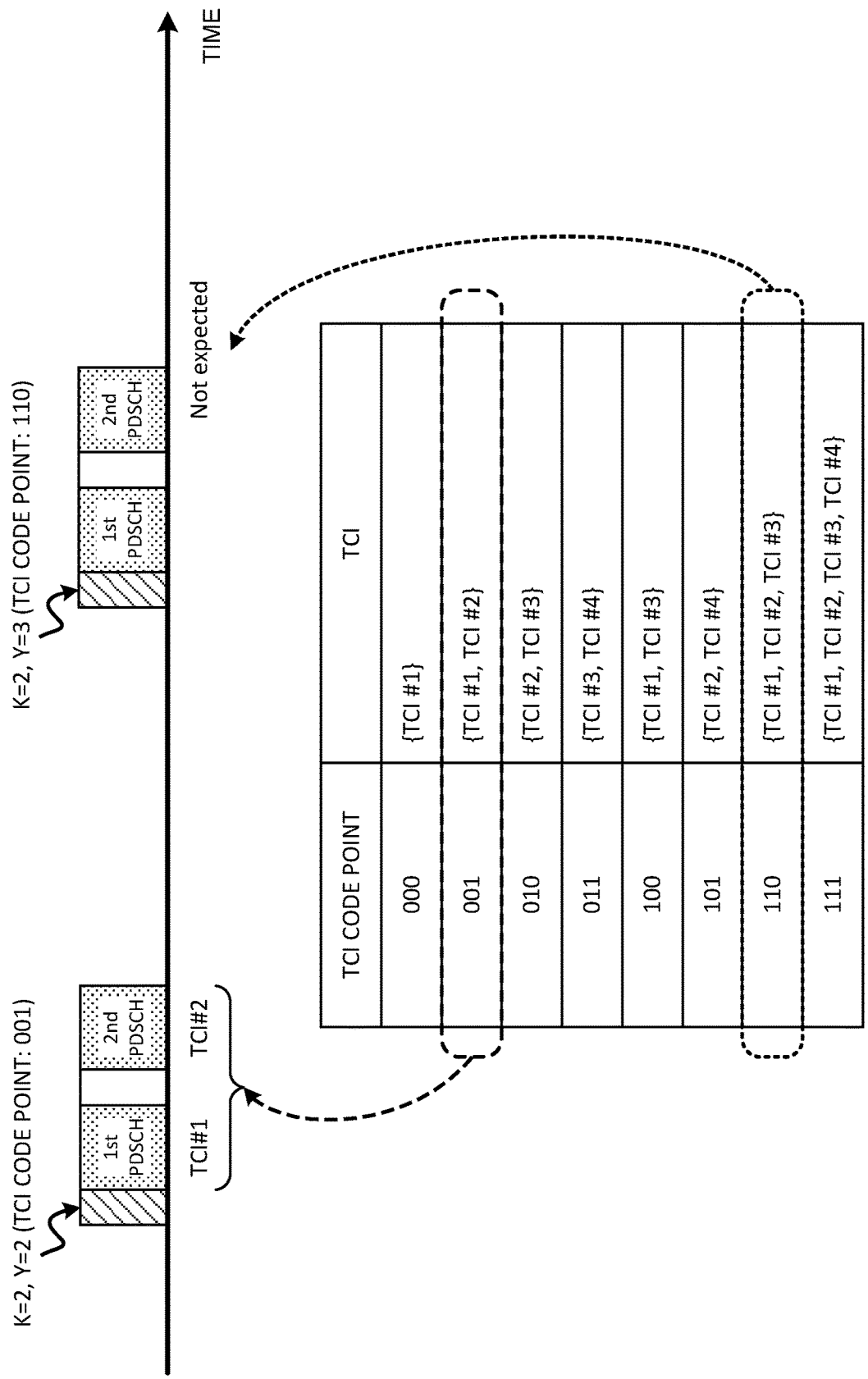
FIG. 4 is a diagram to show another example of the case where the UE does not expect to receive DCI that indicates the number of TCI states different from the number of repetitions.

FIG. 4 is a diagram to show another example of the case where the UE does not expect to receive DCI that indicates the number of TCI states different from the number of repetitions. The case is similar to the case in FIG. 3 except for the different values of K, Y, the TCI code point and the like corresponding to DCI, and therefore, overlapping descriptions are omitted.

As shown at an upper left part in FIG. 4, the UE may receive DCI of K=2 and Y=2 (for example, code point=001). In this case, the UE may determine that an n-th repetition (n-th PDSCH) is an n-th TCI state of the corresponding TCI set. For example, the UE may determine that a first repetition ($1^{st}$ PDSCH) is a first TCI state (TCI #1) of the corresponding TCI set.

On the other hand, as shown at an upper right part in FIG. 4, the UE may not expect to receive DCI of K=2 and Y=3 (code point=110). If the UE receives such DCI, the UE may not perform (may skip) repetition reception of PDSCH that is scheduled by the DCI.

Note that the UE may allow to receive DCI that indicates the number of TCI states different from the number of repetitions of the PDSCH in time domain. In this case, the UE may determine the TCI state corresponding to each transmission occasion by using a uniform mapping rule between TCI states and PDSCH transmission occasions. For example, the UE may assume that an n-th transmission occasion (n=1, 2, . . . , K) among K time repetitions is associated with a mod (n−1, Y)+1 th TCI state among Y number of TCI states indicated by DCI.

Note that mod (A, B) may correspond to a remainder of dividing A by B (modulo operation).

This configuration enables flexible indication of TCI states.

Figure 5:
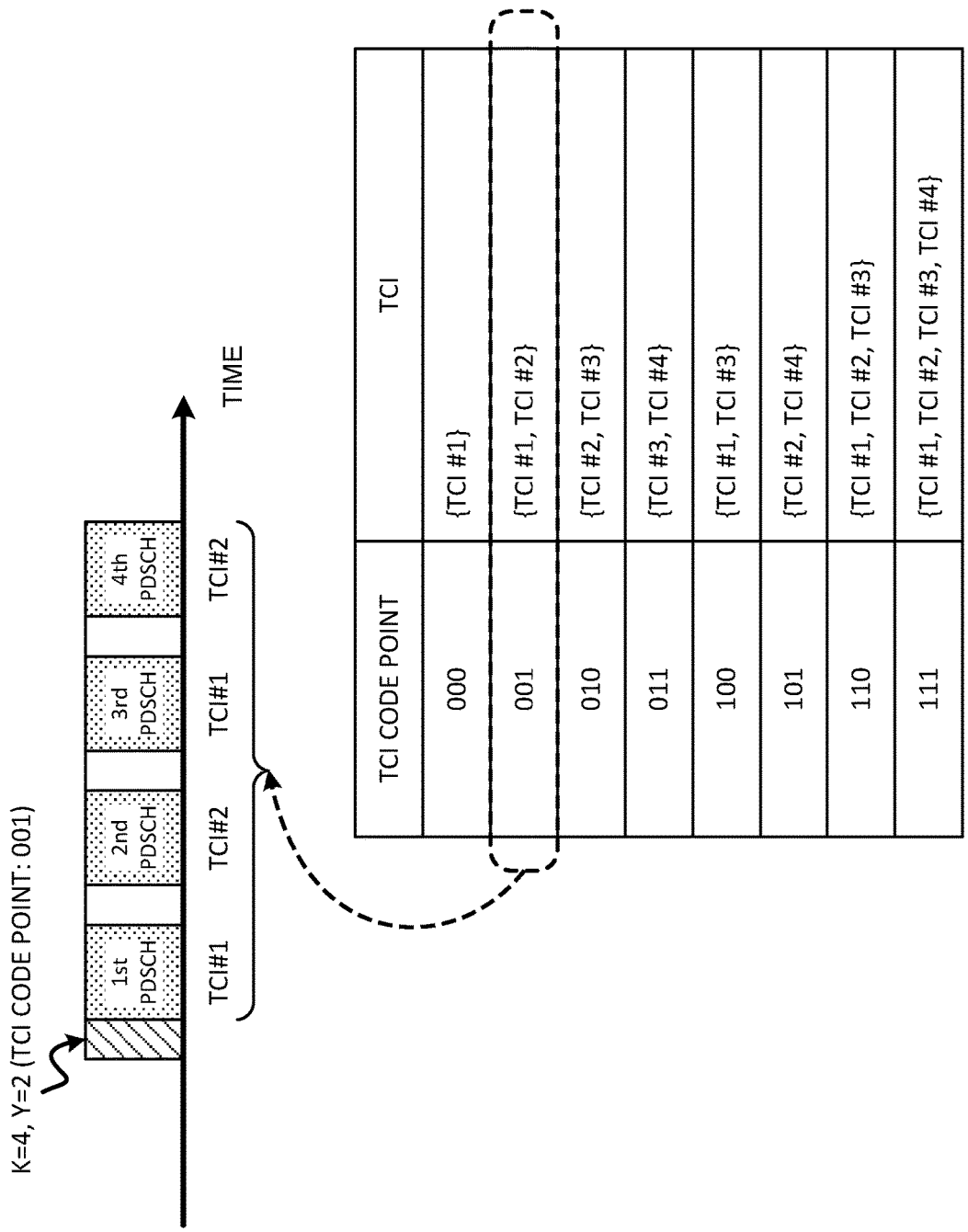
FIG. 5 is a diagram to show an example of a case where the UE allows to receive DCI that indicates the number of TCI states different from the number of repetitions.

FIG. 5 is a diagram to show an example of the case where the UE allows to receive DCI that indicates the number of TCI states different from the number of repetitions. The case is similar to the case in FIG. 3 except for the different values of K, Y, the TCI code point and the like corresponding to DCI, and therefore, overlapping descriptions are omitted.

As shown at an upper part in FIG. 5, the UE may receive DCI of K=4 and Y=2 (for example, code point=001). In this case, the UE may determine that an n-th repetition (n-th PDSCH) is a mod (n−1, Y)+1 th TCI state of the corresponding TCI set.

For example, the UE may determine that a first repetition ($1^{st}$ PDSCH) is a mod (1−1, 2)+1 (=1) th TCI state (TCI #1) of the corresponding TCI set. In this example, the 1st, 2nd, 3rd, and 4th repetitions correspond to TCIs #1, #2, #1, and #2, respectively. In this manner, in a case where the size of the TCI set (number of TCIs included in the TCI set) corresponding to the TCI code point is smaller than the number of repetitions, the UE may apply at least one TCI in the TCI set for a plurality of transmission occasions.

Figure 6:
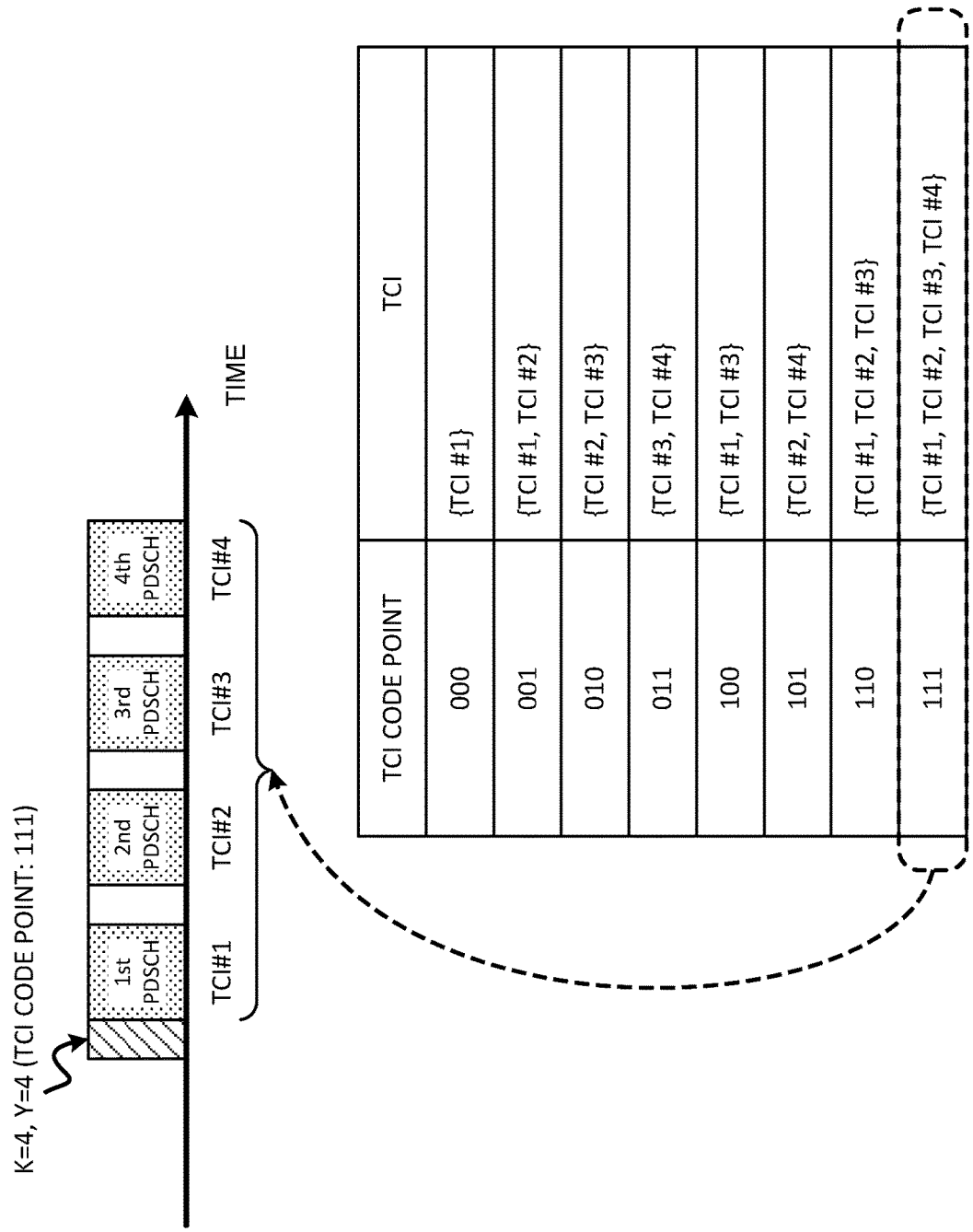
FIG. 6 is a diagram to show another example of the case where the UE allows to receive DCI that indicates the number of TCI states different from the number of repetitions.

FIG. 6 is a diagram to show another example of the case where the UE allows to receive DCI that indicates the number of TCI states different from the number of repetitions. The case is similar to the case in FIG. 3 except for the different values of K, Y, the TCI code point and the like corresponding to DCI, and therefore, overlapping descriptions are omitted.

Although the UE allows to receive DCI that indicates the number of TCI states different from the number of repetitions, the UE may receive DCI that indicates the number of TCI states that is the same as the number of repetitions, as shown in FIG. 6. As shown at an upper part in FIG. 6, the UE may receive DCI of K=4 and Y=4 (for example, code point=111). In this case, the UE may determine that an n-th repetition (n-th PDSCH) is a mod (n−1, Y)+1 th TCI state of the corresponding TCI set. In this example, the 1st, 2nd, 3rd, and 4th repetitions correspond to TCIs #1, #2, #3, and #4, respectively.

Figure 7:
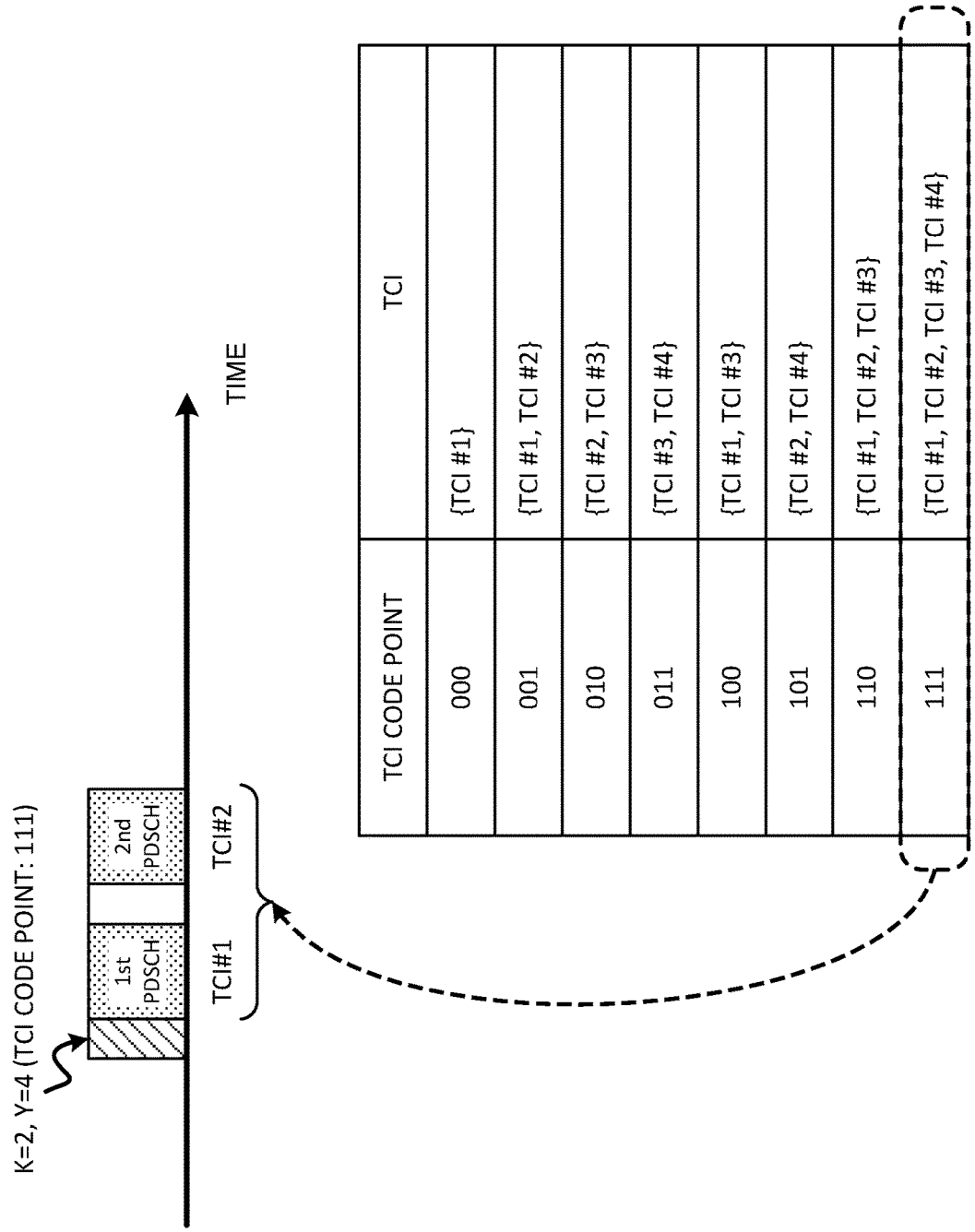
FIG. 7 is a diagram to show yet another example of the case where the UE allows to receive DCI that indicates the number of TCI states different from the number of repetitions.

FIG. 7 is a diagram to show yet another example of the case where the UE allows to receive DCI that indicates the number of TCI states different from the number of repetitions. The case is similar to the case in FIG. 3 except for the different values such as K, Y, the TCI code point and the like corresponding to DCI, and therefore, overlapping descriptions are omitted.

As shown at an upper part in FIG. 7, the UE may receive DCI of K=2 and Y=4 (for example, code point=111). In this case, the UE may determine that an n-th repetition (n-th PDSCH) is a mod (n−1, Y)+1 th TCI state of the corresponding TCI set. In this example, the 1st and 2nd repetitions correspond to TCIs #1 and #2, respectively. In this manner, in a case where the size of the TCI set (number of TCIs included in the TCI set) corresponding to the TCI code point is larger than the number of repetitions, the UE may apply only one or more TCIs for the TCI set, in repetition of the PDSCH.

Note that mapping between the n-th transmission occasion and the Y number of TCI states is not limited to the examples described above. For example, the UE may assume that an n-th transmission occasion (n=1, 2, . . . , K) among K time repetitions is associated with a Y−(mod (n−1, Y)+1)+1 th TCI state among Y number of TCI states indicated by DCI. In this case, for example in FIG. 7, the 1st and 2nd repetitions correspond to TCIs #4 and #3, respectively.

[Mapping of RV to Each Transmission Occasion]
<<First Mapping>>

In relation to repetition of the PDSCH, only a certain RV sequence may be supported. The certain RV sequence may be an RV sequence including RV indices different from each other (not including the same RV indices) (for example, RV sequence {#0, #2, #3, #1}).

Note that, in the present disclosure, the RV sequence may be constituted of one or a plurality of RV indices.

The UE may determine an RV (may be interpreted as an "RV index," an "RV value," and so on) corresponding to an n-th repetition, based on a value of a given field (such as an RV field) in DCI for scheduling repetition of the PDSCH. Note that, in the present disclosure, an n-th repetition and an (n−1)th repetition may be interchangeably interpreted (for example, the 1st repetition may be represented as a "0th repetition").

The UE may determine an RV index to be applied for the 1st repetition, based on an RV field of 2 bits. For example, values of RV fields of "00," "01," "10," and "11" may correspond to RV indices of the 1st repetition of '0,' '1,' '2,' and '3.'

FIG. 8 is a diagram to show an example of mapping of an RV to each transmission occasion. The leftmost column in the table in FIG. 8 indicates an RV index ($rv_{id}$) that is indicated by the RV field. The UE may determine the RV index to be applied for an n-th repetition (transmission occasion), in accordance with this value.

For example, in a case where the $rv_{id}$ indicated by the RV field is 0, the UE may determine n mod 4 (equivalent to mod (n, 4))=0, 1, 2, and 3 to correspond to $rv_{id}$=0, 2, 3, and 1, respectively.

In other words, with respect to an RV sequence {#0, #2, #3, #1}, the UE may start at an RV indicated by the RV field and apply an RV on the immediate right side of the previous RV each time of repetition.

<<Second Mapping>>

In relation to repetition of the PDSCH, more than one RV sequences may be supported. The more than one RV sequences may include, for example, RV sequences {#0, #2, #3, #1}, {#0, #3, #0, #3}, and {#0, #0, #0, #0}.

For repetition of the PDSCH, at least one of the more than one RV sequences may be configured to the UE by higher layer signaling. For example, the UE may determine the RV index to be applied for the 1st repetition from among the configured RV sequences, based on an RV field of 2 bits. The UE may determine the RV index to be applied for an n-th repetition (transmission occasion), based on the RV index applied for the 1st repetition, as described in First Mapping.

Second Mapping may be roughly divided into the following three types, depending on the configuration of the RV field of DCI:

(Mapping 2-1) the number of bits in the RV field is fixed,
(Mapping 2-2) the number of bits in the RV field is variable, and
(Mapping 2-3) no RV field is included.

<<Mapping 2-1>>

The size (number of bits) of the RV field of DCI may be a fixed number of bits (for example, 2 bits) irrespective of an RV sequence configured to the UE. Here, on the condition that the number of RV indices possible to be applied for a 1st repetition is less than the number of values expressible by the fixed number of bits, the possible number of values of the RV field may be assumed to be limited to the number of RV indices possible to be apply for the 1st repetition.

In a case where the configured RV sequence is the RV sequence including RV indices different from each other (not including the same RV indices) (for example, {#0, #2, #3, #1}), the UE may determine the RV index to be applied for each repetition, based on the relationship, as shown in FIG. 8, which is already described in First Mapping.

FIGS. 9A and 9B are diagrams to show examples of mapping of an RV to each transmission occasion in Mapping 2-1. The tables can be understood in the same manner as in FIG. 8, and therefore, overlapping descriptions are omitted.

In a case where the configured RV sequence is an RV sequence including one or more same RV indices (for example, {#0, #3, #0, #3}) in Mapping 2-1, the UE may determine the RV index to be applied for each repetition, based on the relationship, as shown in FIG. 9A.

In a case where the configured RV sequence is an RV sequence constituted of the same RV indices (for example, {#0, #0, #0, #0}) in Mapping 2-1, the UE may determine the RV index to be applied for each repetition, based on the relationship, as shown in FIG. 9B.

FIGS. 9A and 9B show the word "Reserved" in fields other than RV fields corresponding to RV indices included in the configured RV sequence (such fields have an RV index=1 or 2 indicated by RV field the in FIG. 9A and have an RV index=1 to 3 in FIG. 9B). In view of this, the UE may assume that the value of the RV field corresponding to "Reserved" will not be indicated. In this case, possible values of the RV fields are limited, whereby reduction in processing load on the UE can be expected. The UE may use a part of the RV field as a virtual cyclic redundancy check (V-CRC) bit, which can expect to improve a performance for receiving DCI.

FIGS. 10A to 10C are diagrams to show examples of RVs applied for repetitions. In these examples, the UE assumes that an RV sequence {#0, #2, #3, #1} for repeating a PDSCH is configured.

In FIG. 10A, the UE receives DCI indicating K=8 and $rv_{id}=0$. In this case, the UE may determine the 1st to the 8th repetitions to respectively correspond to $rv_{id}=0, 2, 3, 1, 0, 2, 3,$ and 1, based on the mapping in FIG. 8.

In FIG. 10B, first, the UE receives DCI indicating K=4 and $rv_{id}=0$. In this case, the UE may determine the 1st to the 4th repetitions to respectively correspond to $rv_{id}=0, 2, 3,$ and 1, based on the mapping in FIG. 8. In FIG. 10B, the UE then receives DCI indicating K=4 and $rv_{id}=2$. In this case, the UE may determine the 1st to the 4th repetitions to respectively correspond to $rv_{id}=2, 3, 1,$ and 0, based on the mapping in FIG. 8.

In FIG. 10C, first, the UE receives DCI indicating K=2 and $rv_{id}=0$. In this case, the UE may determine the 1st and the 2nd repetitions to respectively correspond to $rv_{id}=0$ and 2, based on the mapping in FIG. 8. In FIG. 10C, the UE then receives DCI indicating K=2 and $rv_{id}=3$. In this case, the UE may determine the 1st and the 2nd repetitions to respectively correspond to $rv_{id}=3$ and 1, based on the mapping in FIG. 8.

<<Mapping 2-2>>

The size (number of bits) of the RV field of DCI may be a variable number of bits (for example, 0 to 2 bits) in accordance with an RV sequence configured to the UE.

For example, the UE to which an RV sequence {#0, #2, #3, #1} is configured, may assume the RV field of DCI to be 2 bits.

The UE to which the RV sequence including partly the same RV indices (for example, {#0, #3, #0, #3}) is configured, may assume the RV field of DCI to be 1 bit.

The UE to which the RV sequence constituted of entirely the same RV indices (for example, {#0, #0, #0, #0}) is configured, may assume the RV field of DCI to be 0 bits.

In Mapping 2-2, an RV sequence may be explicitly configured to the UE, or the number of bits of the RV field may be configured instead of the RV sequence. In the latter case, the UE may assume that a certain RV sequence is configured in accordance with the number of bits of the configured RV field (for example, an opposite case of the above-described example of assuming the size of the RV field from the set of the RV sequence).

In a case where the configured RV sequence is the RV sequence including RV indices different from each other (for example, {#0, #2, #3, #1}) in Mapping 2-2, the UE may determine the RV index to be applied for each repetition, based on the relationship, as shown in FIG. 8, which is already described in First Mapping.

FIGS. 11A and 11B are diagrams to show examples of mapping of an RV to each transmission occasion in Mapping 2-2. The tables can be understood in the same manner as in FIG. 8, and therefore, overlapping descriptions are omitted.

In a case where the configured RV sequence is the RV sequence including partly the same RV indices (for example, {#0, #3, #0, #3}) in Mapping 2-2, the UE may determine the RV index to be applied for each repetition, based on the relationship as shown in FIG. 11A.

In a case where the configured RV sequence is the RV sequence constituted of entirely the same RV indices (for example, {#0, #0, #0, #0}) in Mapping 2-2, the UE may determine the RV index to be applied for each repetition, based on the relationship, as shown in FIG. 11B.

FIGS. 11A and 11B are composed without rows corresponding to "Reserved" in FIGS. 9A and 9B. Note that, in FIG. 11A, the RV sequence ({#3, #0, #3, #0}), which corresponds to $rv_{id}=3$ indicated by DCI in FIG. 9A, is applied for a case of $rv_{id}=1$ indicated by DCI.

In FIG. 11B, in a case where the UE receives DCI not including the RV field, the UE may assume that $rv_{id}=0$ is indicated by the DCI.

FIGS. 12A to 12C are diagrams to show examples of RVs applied for repetitions. In these examples, the UE assumes that an RV sequence {#0, #3, #0, #3} for repeating a PDSCH is configured.

In FIG. 12A, the UE receives DCI indicating K=8 and $rv_{id}=0$. In this case, the UE may determine the 1st to the 8th repetitions to respectively correspond to $rv_{id}=0, 3, 0, 3, 0, 3, 0$, and 3, based on the mapping in FIG. 11A.

In FIG. 12B, first, the UE receives DCI indicating K=4 and $rv_{id}=0$. In this case, the UE may determine the 1st to the 4th repetitions to respectively correspond to $rv_{id}=0, 3, 0$, and 3, based on the mapping in FIG. 11A. In FIG. 12B, the UE then receives DCI indicating K=4 and $rv_{id}=1$. In this case, the UE may determine the 1st to the 4th repetitions to respectively correspond to $rv_{id}=3, 0, 3$, and 0, based on the mapping in FIG. 11A.

In FIG. 12C, first, the UE receives DCI indicating K=2 and $rv_{id}=0$. In this case, the UE may determine the 1st and the 2nd repetitions to respectively correspond to $rv_{id}=0$ and 3, based on the mapping in FIG. 11A. In FIG. 12C, the UE then receives DCI indicating K=2 and $rv_{id}=1$. In this case, the UE may determine the 1st and the 2nd repetitions to respectively correspond to $rv_{id}=3$ and 0, based on the mapping in FIG. 11A.

<<Mapping 2-3>>

In Mapping 2-3, DCI for scheduling repetition includes no RV field. The UE may determine an RV sequence to be applied for repetition, based on another field (such as a TCI field).

Mapping 2-3 may be assumed to be used in the case where a scheduling offset (in other words, time offset) between reception of DL DCI (DCI for scheduling a PDSCH) and the corresponding PDSCH (PDSCH scheduled by the DCI) is less than a threshold value. This is because, in Rel-15 NR, the TCI field in this case is ignored (default quasi-co-location (QCL) assumption is applied to the PDSCH).

Note that, in the present disclosure, the scheduling offset of repetition of the PDSCH may mean an offset between DCI and a certain PDSCH transmission occasion corresponding to the DCI (for example, the first or the last repetition transmission occasion).

The threshold value may be referred to as a "QCL time length," a "Threshold," a "Threshold for offset between a DCI indicating a TCI state and a PDSCH scheduled by the DCI," RRC parameter "timeDurationForQCL," a "Threshold-Sched-Offset," a "schedule offset threshold value," a "scheduling offset threshold value," and so on. The threshold value may be configured by higher layer signaling.

The UE may use the first or the last x bits (x>0) of such another field (such as a TCI field) as the RV field that is described in Mapping 2-1, 2-2, and so on. Here, x may be fixed to the given number of bits (such as 2 bits) or may be configured (to be, for example, one of 0 to 2 bits) by higher layer signaling.

Note that the UE may assume that repetition of the PDSCH is not performed in a case where the scheduling offset is the threshold value or greater. In other words, the UE may assume that repetition of the PDSCH is performed only in a case where the scheduling offset is less than the threshold value. The repetition of the PDSCH may use a certain TCI set, as described later in Second Embodiment, or may use a fixed TCI state.

Note that the RV sequence to be applied for repetition may be determined based on another field (such as a TCI field) in addition to or instead of the RV field, in other mapping (for example, First Mapping described above, and Third Mapping described later).

<<Third Mapping>>

In relation to repetition of the PDSCH, more than one RV sequences may be supported. The more than one RV sequences may include, for example, RV sequences {#0, #2, #3, #1}, {#0, #3, #0, #3}, and {#0, #0, #0, #0}.

For repetition of the PDSCH, the more than one RV sequences may be configured to the UE by higher layer signaling. The UE may determine the RV sequence to be applied for repetition from among the configured RV sequences, for example, based on an RV field of 2 bits. Note that the number of bits of the RV field included in DCI may vary in accordance with the number of the configured RV sequences.

The UE may apply an n-th RV index of the determined RV sequence for an n-th repetition (transmission occasion). For example, supposing that the size of the determined RV sequence (number of RV indices included in the RV sequence) is Z, the UE may determine use of a mod (n−1, Z)+1 th RV of the determined RV sequence at an n-th repetition. Note that Z may be four, for example.

FIGS. 13A and 13B are diagrams to show examples of mapping of an RV to each transmission occasion in Third Mapping. These examples are similar to that in FIG. 8, but differ in that right parts of the tables show RV sequences.

FIG. 13A shows a case where four RV sequences (first to fourth RV sequences) are configured. FIG. 13B shows a case where three RV sequences (first to third RV sequences) are configured. As shown in FIG. 13B, in a case where the number of the configured RV sequences is less than four, the value of the RV field to be not used may correspond to "Reserved."

Figure 14A:
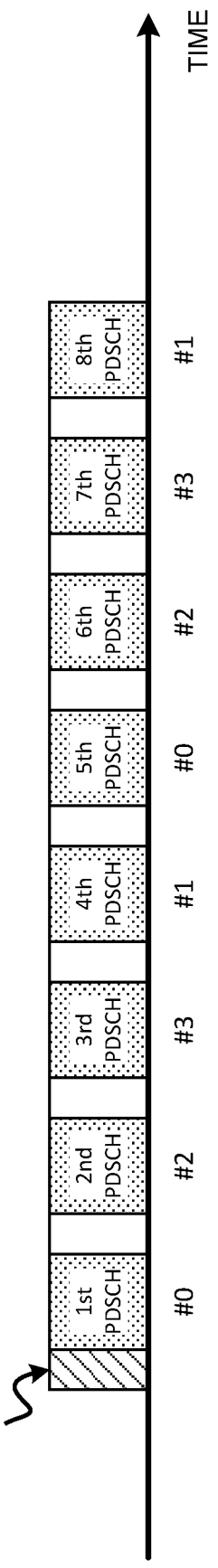
FIGS. 14A to 14C are diagrams to show examples of RVs applied for repetitions.
Figure 14B:
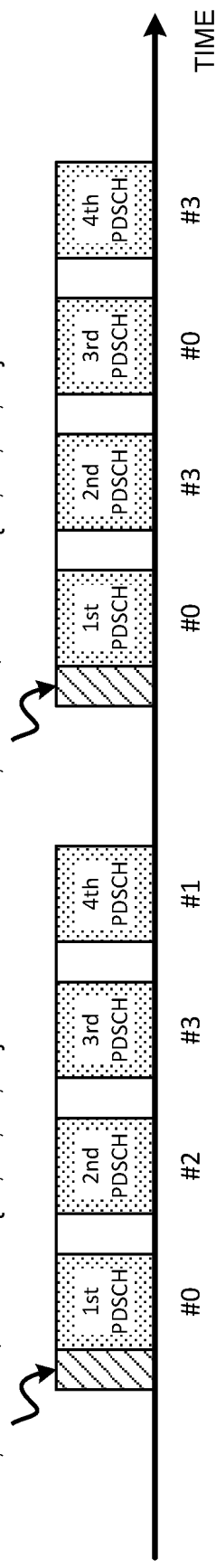
Figure 14C:
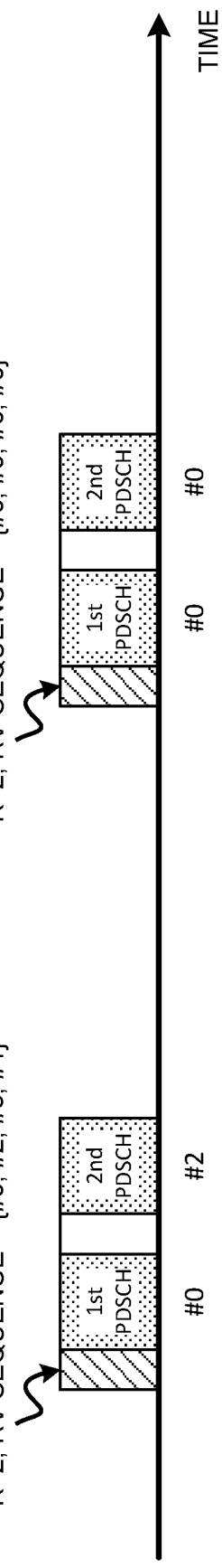

FIGS. 14A to 14C are diagrams to show examples of RVs applied for repetitions. In these examples, the UE assumes that {#0, #2, #3, #1} is configured as a first RV sequence, {#0, #3, #0, #3} is configured as a second RV sequence, and {#0, #0, #0, #0} is configured as a third RV sequence.

In FIG. 14A, the UE receives DCI indicating K=8 and $rv_{id}=0$. In this case, the UE may determine the 1st to the 8th repetitions to respectively correspond to $rv_{id}=0, 2, 3, 1, 0, 2, 3$, and 1, for example, based on the mapping in FIG. 13A and the first RV sequence.

In FIG. 14B, first, the UE receives DCI indicating K=4 and $rv_{id}=0$. In this case, the UE may determine the 1st to the 4th repetitions to respectively correspond to $rv_{id}=0, 2, 3$, and 1, based on the mapping in FIG. 13A and the first RV sequence. In FIG. 14B, the UE then receives DCI indicating K=4 and $rv_{id}=1$. In this case, the UE may determine the 1st to the 4th repetitions to respectively correspond to $rv_{id}=0, 3, 0$, and 3, based on the mapping in FIG. 13A and the second RV sequence.

In FIG. 14C, first, the UE receives DCI indicating K=2 and $rv_{id}=0$. In this case, the UE may determine the 1st and the 2nd repetitions to respectively correspond to $rv_{id}=0$ and 2, based on the mapping in FIG. 13A and the first RV sequence. In FIG. 14C, the UE then receives DCI indicating K=2 and $rv_{id}=1$. In this case, the UE may determine the 1st and the 2nd repetitions to respectively correspond to $rv_{id}=0$ and 0, based on the mapping in FIG. 13A and the third RV sequence.

The first embodiment described above enables appropriately determining the TCI and the RV relating to repetition of the PDSCH, based on different respective fields of DCI.

Second Embodiment

In a second embodiment, in relation to repetition of the PDSCH, a TCI state and an RV sequence may be indicated jointly (together) based on one field of DCI. The one field may be referred to as a "TCI-RV field," a "joint field," and so on. The same rule may be defined to the mapping relationship between repetition (transmission occasion) of the PDSCH and TCI states and the mapping relationship between repetition of the PDSCH and an RV sequence.

[TCI and RV for Repetition of PDSCH]

In the second embodiment, a combination of one or a plurality of TCIs and an RV sequence that are to be applied for each repetition unit (hereinafter also referred to as a "TCI-RV set" and so on) may be configured to the UE by higher layer signaling (such as RRC signaling).

Here, the one or the plurality of TCIs may be configured in association with an index of a TCI set, and the RV sequence may be configured in association with an index of the RV sequence.

The TCI-RV set may be configured in association with at least one of an index of a TCI set, an index of an RV set, a TCI index, an RV index, and so on. The TCI-RV set may be configured in association with a TCI-RV set index for identifying the TCI-RV set.

Note that one or a plurality of TCI-RV sets among TCI-RV sets configured by RRC signaling may be activated by MAC signaling (such as a MAC CE).

The MAC CE may include information such as one or more TCI-RV indices to be activated.

The UE may determine one TCI-RV set based on a certain field of DCI (for example, DCI format 1_1), from among TCI-RV sets configured, activated, or the like by at least one of RRC signaling and a MAC CE. The DCI may correspond to DCI for indicating repetition of the PDSCH. Note that the certain field may be a field for identifying a TCI-RV set to be applied for repetition and may be referred to as a "TCI-RV set field" and so on.

The number of bits of the TCI-RV set field may vary depending on configured TCI-RV sets or the number of candidates for (or maximum number of) TCI-RV sets to be activated.

FIG. 15 is a diagram to show an example of correspondence relationships between TCI-RV set fields and TCI-RV sets. This example shows values (may be referred to as "joint code points") of the TCI-RV set fields included in DCI, corresponding TCIs (TCI sets), and corresponding RV sequences. This example shows TCI-RV set fields of 3 bits. The value of the code point may correspond to a TCI-RV set index.

For example, a UE that receives DCI of a joint code point=000 may determine that a TCI state to be applied for repetition of PDSCH is {#0, #1, #2, #3} whereas a RV sequence is {#0, #0, #0, #0}.

Supposing that the number of one or a plurality of TCI states (for example, the number of TCI indices included in a TCI set) corresponding to a joint code point indicated by DCI is Z1, the UE may determine use of a mod (n−1, Z1)+1 th TCI at an n-th repetition, among corresponding one or a plurality of TCI. Note that Z1 may be four, for example.

Supposing that the size of an RV sequence (the number of RV indices included in an RV sequence) corresponding to a joint code point indicated by DCI is Z2, the UE may determine use of a mod (n−1, Z2)+1 th RV of the corresponding RV sequence, at an n-th repetition. Note that Z2 may be four, for example. The Z2 may be the same as or different from Z1.

Figure 16:
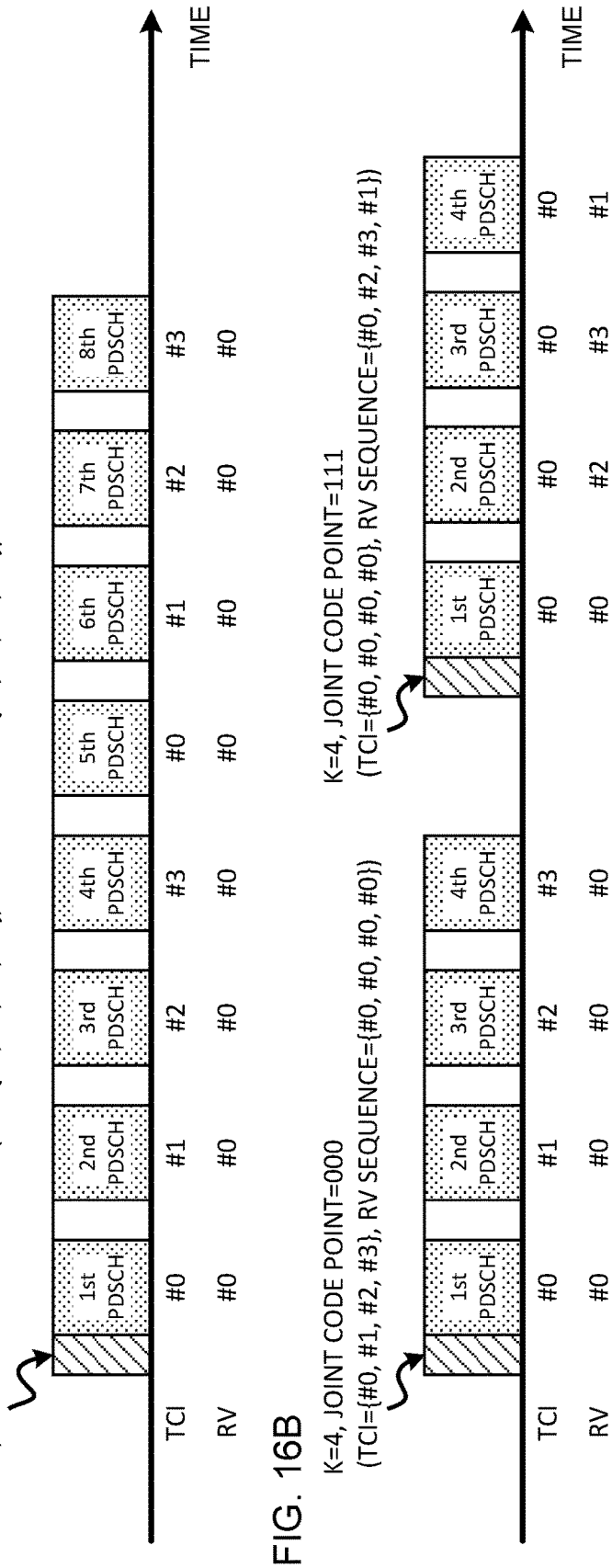
FIGS. 16A to 16C are diagrams to show examples of TCIs and RVs applied for repetitions.

FIGS. 16A to 16C are diagrams to show examples of TCIs and RVs applied for repetitions. In these examples, the UE assumes that correspondence relationships between code points and TCI-RV sets in FIG. 15 are configured.

In FIG. 16A, the UE receives DCI indicating K=8 and a joint code point=000. In this case, the UE may determine the 1st to the 8th repetitions to respectively correspond to (ICI, $rv_{id}$)=(0, 0), (1, 0), (2, 0), (3, 0), (0, 0), (1, 0), (2, 0), and (3, 0), for example, based on the mapping in FIG. 15.

In FIG. 16B, first, the UE receives DCI indicating K=4 and a joint code point=000. In this case, the UE may determine the 1st to the 4th repetitions to respectively correspond to (TCI, $rv_{id}$)=$^0$), (1, 0), (2, 0), and (3, 0), for example, based on the mapping in FIG. 15. In FIG. 16B, the UE then receives DCI indicating K=4 and a joint code point=111. In this case, the UE may determine the 1st to the 4th repetitions to respectively correspond to (TCI, $rv_{id}$)=(0, 0), (0, 2), (0, 3), and (0, 1), for example, based on the mapping in FIG. 15.

In FIG. 16C, first, the UE receives DCI indicating K=2 and a joint code point=000. In this case, the UE may determine the 1st and the 2nd repetitions to respectively correspond to (TCI, $rv_{id}$)=(0, 0) and (1, 0), for example, based on the mapping in FIG. 15. In FIG. 16C, the UE then receives DCI indicating K=2 and a joint code point=001. In this case, the UE may determine the 1st and the 2nd repetitions to respectively correspond to (TCI, $rv_{id}$)=(0, 0) and (1, 3), for example, based on the mapping in FIG. 15.

[Scheduling Offset]

In a case where the scheduling offset between reception of DCI and repetition of the PDSCH corresponding to the DCI is less than a threshold value, the UE may assume that the TCI state to be applied for each repetition conforms with default QCL assumption (for example, QCL assumption of a minimum CORESET ID in the latest slot, defined in Rel-15 NR) or is the same QCL as that of a PDCCH (CORESET) for receiving the DCI.

In the case where the scheduling offset is less than the threshold value, the UE may assume that the TCI state to be applied for each repetition is based on a certain TCI set among TCI sets configured by higher layer signaling.

The certain TCI set may be a TCI set corresponding to a certain TCI-RV set (or TCI set) index (for example, a maximum or minimum TCI-RV set (or TCI set) index) or may be a TCI set corresponding to a certain DCI code point (such as "000").

In the case where the scheduling offset is less than the threshold value, the UE may assume that the RV sequence to be applied for repetition of the PDSCH is determined by specifications in advance or is based on a certain RV sequence among RV sequences configured or activated by higher layer signaling.

The certain RV sequence may be an RV sequence corresponding to a certain TCI-RV set (or TCI set) index (for example, a maximum or minimum TCI-RV set (or TCI set) index) or may be an RV sequence corresponding to a certain DCI code point (such as "000").

For example, in the case where the scheduling offset is less than the threshold value, the UE may assume that the TCI state to be applied for each repetition conforms with default QCL assumption whereas the RV conforms with the certain RV sequence.

Note that at least one of these assumptions may be applied for the case where the scheduling offset is less than the threshold value, in other embodiments.

The second embodiment described above enables appropriately determining the TCI and the RV relating to repetition of the PDSCH, based on the same field of DCI.

Other Embodiment

Note that, even in a case where the number of repetitions of a certain channel/signal is not explicitly configured, indicated, or the like, the UE may determine the number of repetitions of the channel/signal based on at least one of the number of TCI states (for example, the size of a TCI set to be used) to be applied for the channel/signal, and the number of RV sequences.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 17:
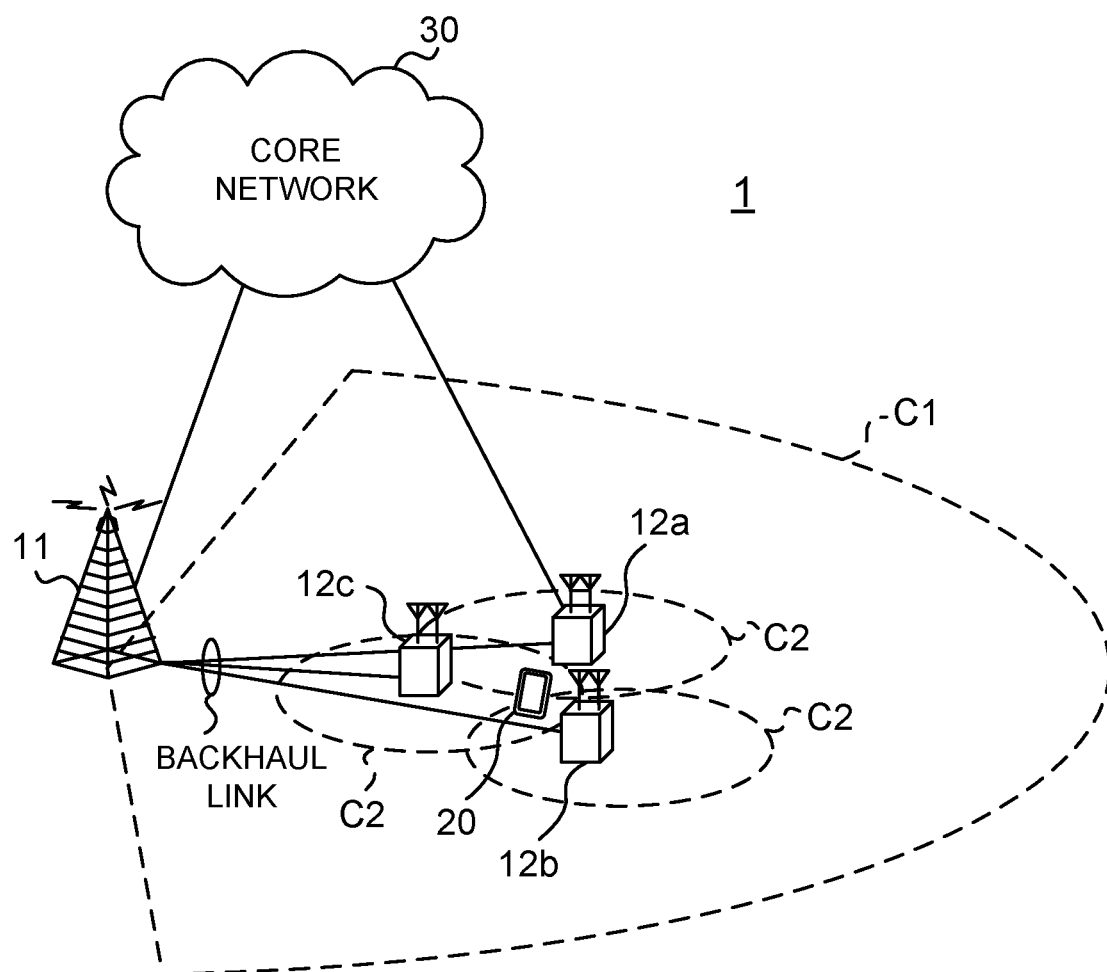
FIG. 17 is a diagram to show an example of a schematic structure of a radio communication system according to one embodiment.

FIG. 17 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are transmitted on the PDSCH. User data, higher layer control information and so on may be transmitted on the PUSCH. The Master Information Blocks (MIBs) may be transmitted on the PBCH.

Lower layer control information may be transmitted on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant,"

"UL DCI," and so on. Note that the PDSCH may be interpreted as "DL data," and the PUSCH may be interpreted as "UL data."

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be transmitted by means of the PUCCH. By means of the PRACH, random access preambles for establishing connections with cells may be transmitted.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be transmitted. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be transmitted as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be transmitted as an uplink reference signal (UL-RS). Note that DMRS may be referred to as a "user terminal specific reference signal (UE-specific Reference Signal)."

(Base Station)

Figure 18:
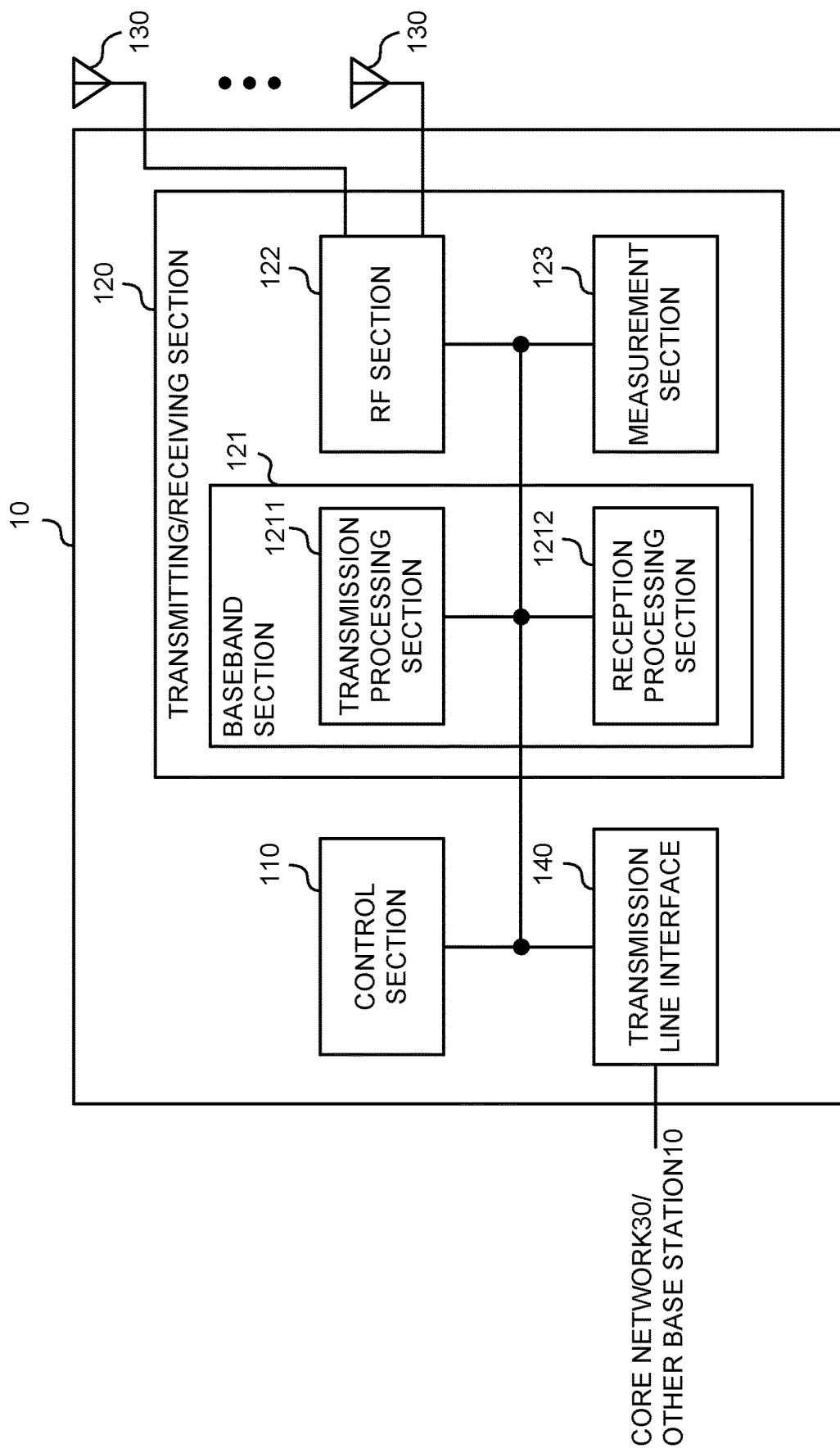
FIG. 18 is a diagram to show an example of a structure of a base station according to one embodiment.

FIG. 18 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 may repeatedly transmit a channel/signal (such as a PDSCH) to the user terminal 20. The control section 110 may control generation and transmission of control information (such as RRC signaling, MAC CE, and DCI) for the repetition transmission.

(User Terminal)

Figure 19:
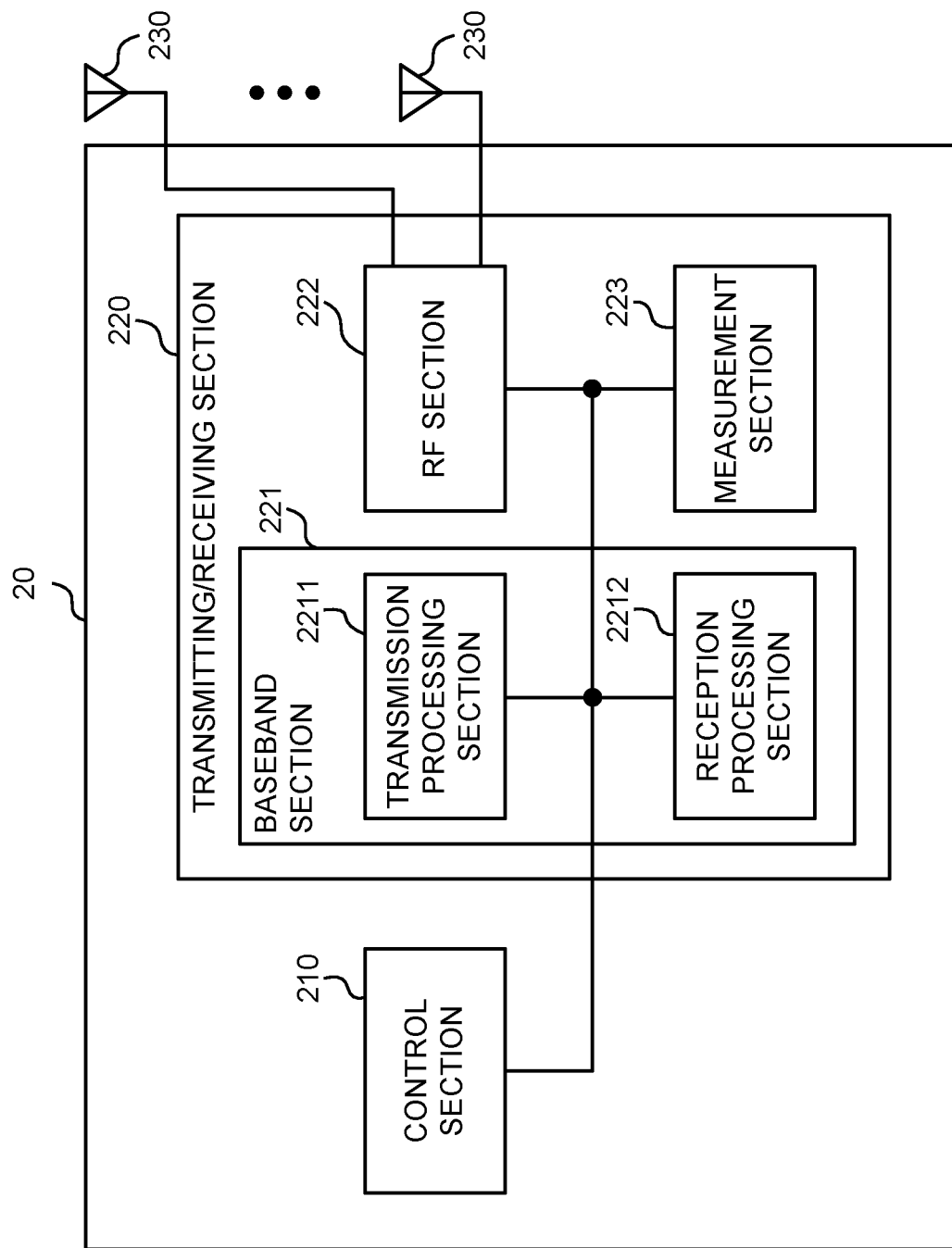
FIG. 19 is a diagram to show an example of a structure of a user terminal according to one embodiment.

FIG. 19 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be constituted as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (the RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (the RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (the measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the control section 210 may determine a set of transmission configuration indication states (TCI states) to be applied for a repeatedly transmitted channel (such as PDSCH), based on a field of downlink control information (DCI) for scheduling the channel. The field may be a field for TCI (TCI field) or a joint field for TCI and RV (TCI-RV field).

The transmitting/receiving section 220 may receive the channel based on the set. The reception of the channel may include reception processing (for example, decoding) of the channel.

The control section 210 may not expect to receive the DCI that indicates the set having the number of TCI states different from the number of repetitions of the channel.

The control section 210 may assume that an n-th transmission occasion of the channel is associated with a mod (n−1, Y)+1 th TCI state among Y number of TCI states included in the set.

In a case where a scheduling offset between reception of the DCI and reception of channel (for example, reception of the channel in a first repetition) is less than a threshold value (for example, time length for QCL), the control section 210 the control section may assume that the set is of certain TCI states irrespective of the field.

The control section 210 may determine mapping of a sequence of a redundancy version (RV), which is to be applied for a channel (such as a PDSCH) that is repeatedly transmitted, to each transmission occasion, based on a field of downlink control information (DCI) for scheduling the channel. The field may be a field for RV (RV field) or a joint field for TCI and RV (TCI-RV field).

The transmitting/receiving section 220 may receive the channel based on the mapping. The reception of the channel may include reception processing (for example, decoding) of the channel.

The control section 210 may determine the size of the field of the DCI based on the sequence configured to the user terminal 20.

In the case where the scheduling offset between reception of the DCI and reception of the channel (for example, reception of the channel at a first repetition) is less than the threshold value, the control section 210 may determine the mapping based on the field for a transmission configuration indication state (TCI state) included in the DCI.

In the case where the scheduling offset between reception of the DCI and reception of the channel is less than the threshold value, the control section 210 may assume that the sequence is a certain RV sequence irrespective of the field.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 20:
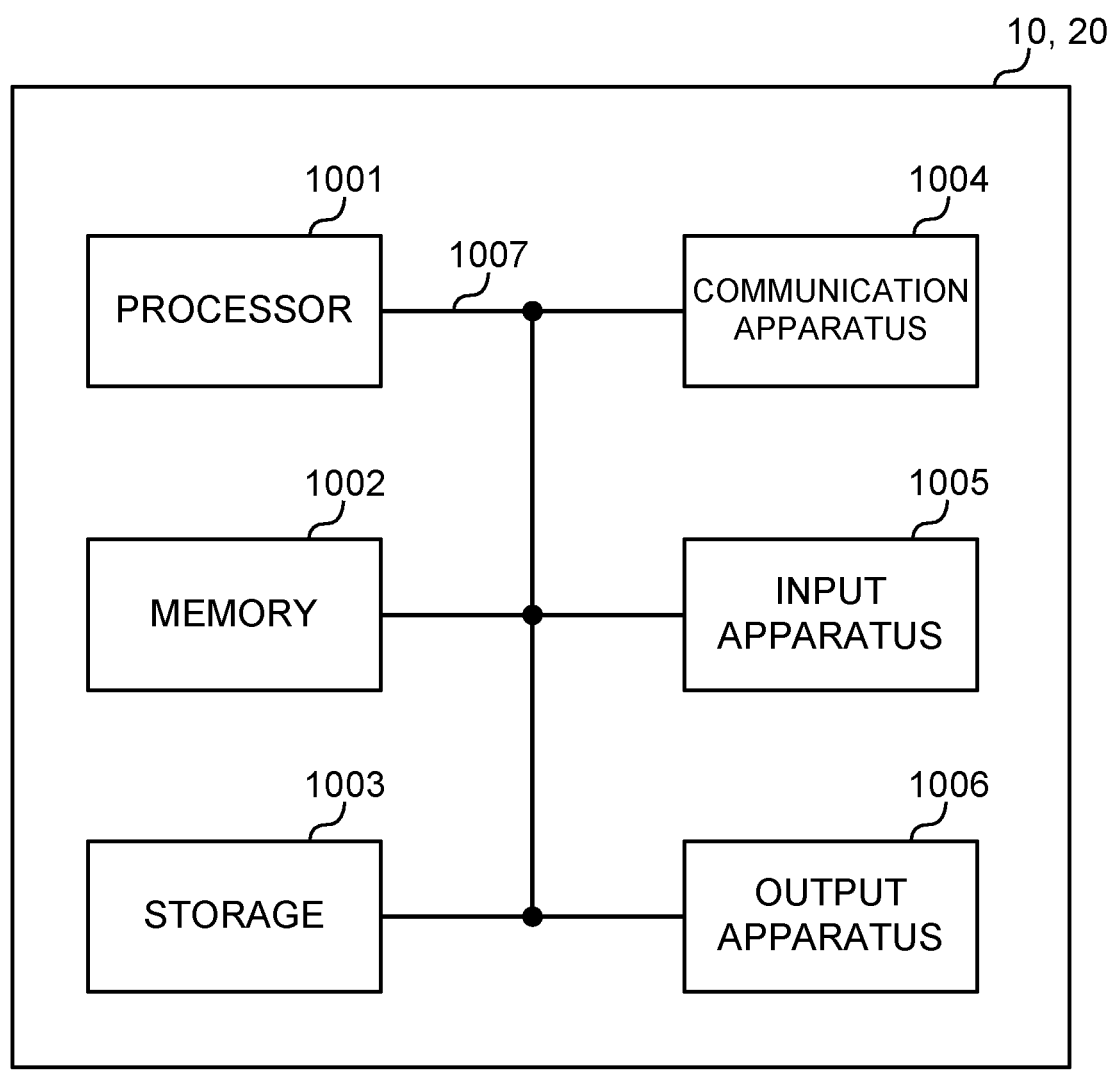
FIG. 20 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 20 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

VARIATIONS

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and the UE does not need to assume to transmit/receive a given signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be indicated by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmission power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation.

The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a processor that determines, based on a field regarding redundancy version (RV) and a transmission configuration indication (TCI) field indicating a number of TCI in downlink control information (DCI) scheduling a channel repetitively transmitted, a mapping between a plurality of indices of the RV applied for the channel and each transmission occasion of the channel; and
    a receiver that receives the channel based on the mapping,
    wherein the processor determines the mapping based on a codepoint of the TCI field, in response to an offset between a reception of the DCI and a reception of the channel being less than a threshold.

2. A radio communication method for a terminal, comprising:
    determining, based on a field regarding redundancy version (RV) and a transmission configuration indication (TCI) field indicating a number of TCI in downlink control information (DCI) scheduling a channel repetitively transmitted, a mapping between a plurality of indices of the RV applied for the channel and each transmission occasion of the channel; and
    receiving the channel based on the mapping,
    wherein the mapping is determined based on a codepoint of the TCI field, in response to an offset between a reception of the DCI and a reception of the channel being less than a threshold.

3. A base station comprising:
a processor that controls generation of downlink control information (DCI) that schedules a channel repetitively transmitted and contains a field regarding redundancy version (RV) and a transmission configuration indication (TCI) field indicating a number of TCI for determining a mapping between a plurality of indices of the RV applied for the channel and each transmission occasion of the channel, wherein the mapping is determined based on a codepoint of the TCI field, in response to an offset between a reception of the DCI and a reception of the channel being less than a threshold; and
a transmitter that transmits the DCI and transmits the channel.

4. A system comprising a terminal and a base station, wherein
the terminal comprises:
a processor of the terminal that determines, based on a field regarding redundancy version (RV) and a transmission configuration indication (TCI) field indicating a number of TCI in downlink control information (DCI) scheduling a channel repetitively transmitted, a mapping between a plurality of indices of the RV applied for the channel and each transmission occasion of the channel; and
a receiver that receives the channel based on the mapping,
wherein the processor determines the mapping based on a codepoint of the TCI field, in response to an offset between a reception of the DCI and a reception of the channel being less than a threshold, and
the base station comprises:
a processor of the base station that controls generation of the DCI, and
a transmitter that transmits the DCI and transmits the channel.

\* \* \* \* \*